Dec. 11, 1962 A. ALFORD ETAL 3,068,428

DIPLEXING UNIT

Filed June 16, 1955 4 Sheets-Sheet 1

INVENTOR.
Andrew Alford
Harold H Leach

INVENTOR.
Andrew Alford
Harold H Leach

INVENTOR.
Andrew Alford
Harold H. Leach

INVENTORS
Andrew Alford
Harold H. Leach 3,068,428

DIPLEXING UNIT

Andrew Alford and Harold H. Leach, Winchester, Mass.; said Leach assignor to said Alford Filed June 16, 1955, Ser. No. 515,932
14 Claims. (Cl. 333—9)

The present invention relates to a diplexing system in which an antenna is fed through a single feeder from two independent sources such as, for example, an aural transmitter and a visual transmitter in a television station. The invention applies also to other diplexing systems where two different sources of radio frequency power may be operating in frequency bands relatively close to each other and are to be combined over a single feeder to a load.

The diplexing system of our invention operates on the basis of frequency separation rather than on the bridge principle. In the case of television transmission, the frequency band for the visual transmitter may extend, for instance, from 180.000 mc. to 185.430 mc. with the visual carrier frequency at 181.250 mc. The aural carrier may be at 185.750 mc. and the aural channel from 185.710 mc. to 185.790 mc.; the space between the end of the visual channel and the beginning of the aural channel; namely from 185.430 mc. to 185.710 mc., serving as a guard band between the two channels.

One of the objects of the present invention is to combine the transmission of two separate carrier frequencies as well as their modulation, whether amplitude or frequency modulated, over a single feeder system to a load in such a manner that each carrier frequency can be independently modulated as, for instance, in the transmission of visual and aural signals in television or any other different applicable combinations.

Figure 1:
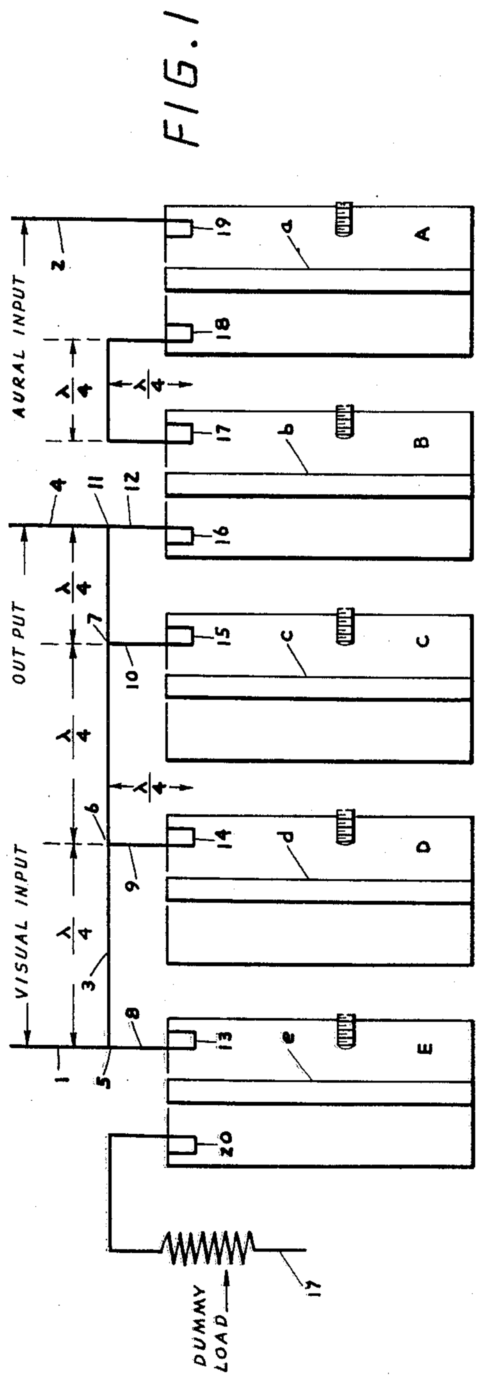
Figure 5:
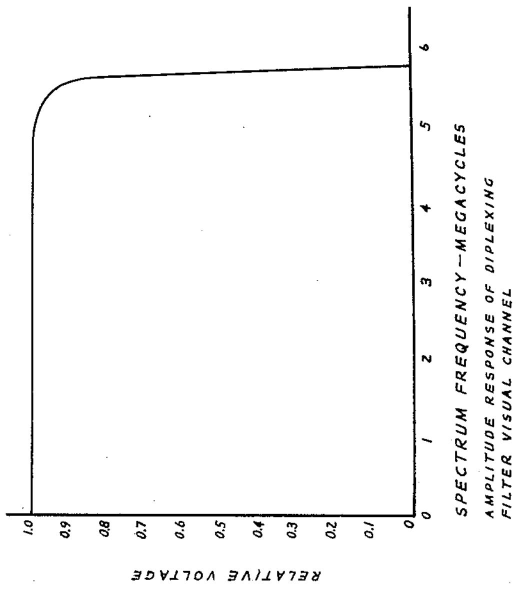
Figure 6:
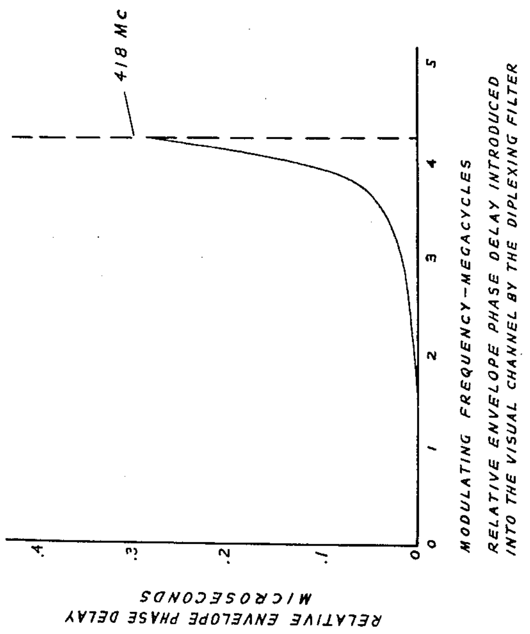
Figure 7:
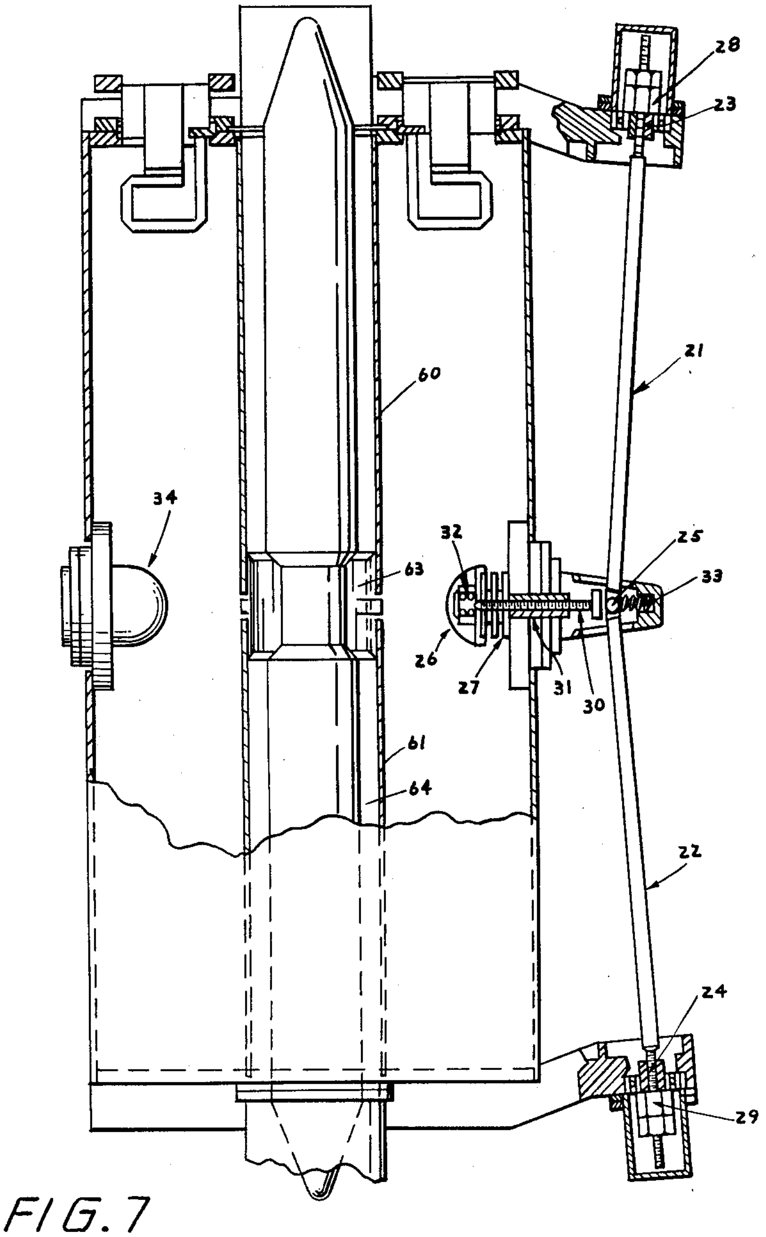
Figure 8:
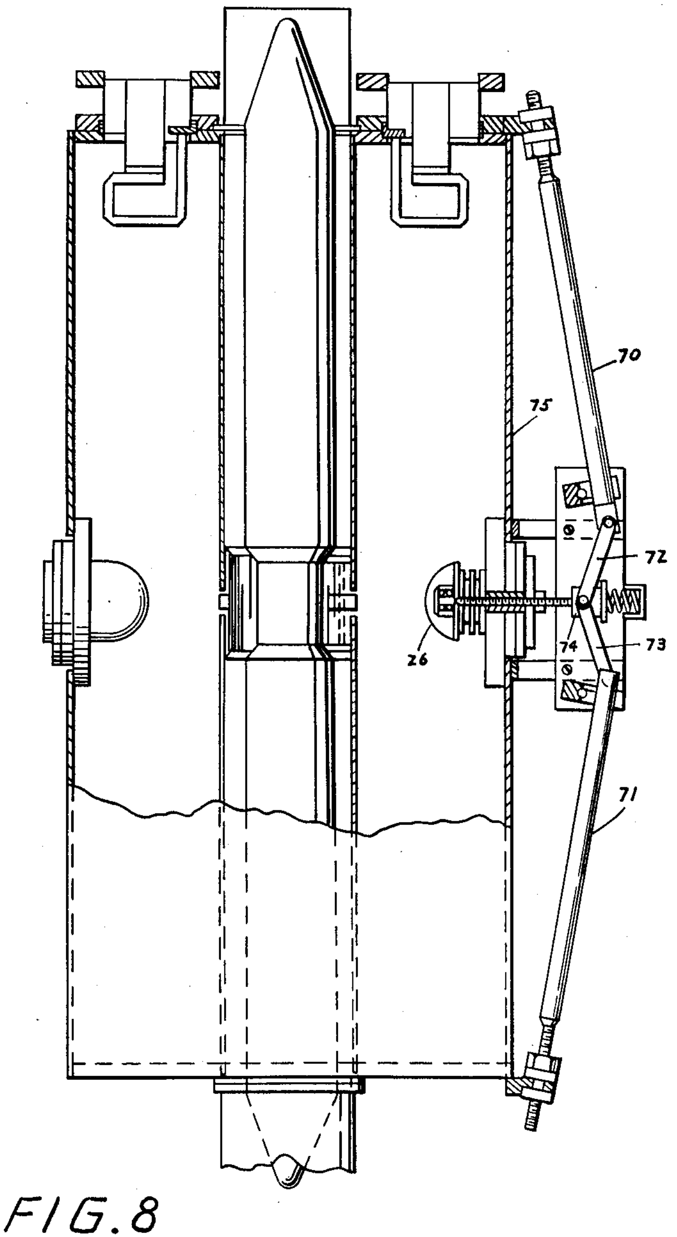

Other purposes and advantages of the present invention will be better understood from a description in the specification as set forth below in which:

FIGURE 1 shows somewhat diagrammatically a system for a diplexing filter as herein employed, FIGURES 2 through 6 show certain characteristics of the diplexing filter of our invention, and FIGURES 7 and 8 show means for compensating cavity length for temperature changes.

In the arrangement shown in FIGURE 1 there are indicated five cavity resonators, A, B, C, D and E, each of which comprises a tuned resonant electrical tank circuit with internal coaxial conductors *a*, *b*, *c*, *d* and *e*, each of which tanks are tuned to resonate at or near the aural carrier frequency being transmitted. These tanks may be made either as quarter wave length resonant cavities or half wave length resonant cavities as desired. The different tuned circuits and terminals are intercoupled by means including wave transmission means, such as transmission lines or electrical equivalents.

The input for one frequency band which may be the visual frequency band in a television system is impressed upon the diplexing filter over the line 1 while the other frequency band which may be the aural frequency band in a television system may be impressed upon the diplexing filter over the line 2. The line 1 is connected through the line 3 directly with the output, line 4, of the diplexing filter, while the line 2 is connected, through tanks A and B, to the output, line 4. Line 4 may be connected to an antenna as in a television system or to another suitable load. The line 3 is branched at junctions 5, 6 and 7 by line sections 8, 9 and 10 into the tanks E, D and C respectively. Each of these sections 8, 9 and 10 are electrically equivalent to one quarter wave length line section at the aural carrier frequency and the section between the points 5 and 6, the points 6 and 7 and between the points

7 and 11 are quarter wave length line sections. All of these line sections could be any odd number of quarter wave lengths long provided that the overall length is not so long that the deviation from the odd number of quarter wave lengths in the band desired is not excessive. One quarter wave length sections have been chosen for convenience.

The line sections 8, 9, 10 and 12 connecting the tanks E, D, C and B respectively, terminate in coupling loops 13, 14, 15 and 16 in the resonant cavities, coupling the branches of the line 3 with these resonators.

The visual frequency band transmitted over the line 1 is practically entirely transmitted along the line 3 because the tanks E, D, C and B, being tuned at or near the aural carrier frequency, are off resonance at the visual frequencies. Since it can be shown that the impedance reflected into the coupling loop of a half wave length resonant cavity is:

$$Z_1 \frac{S_i^2}{\frac{S_o^2}{Z_2} + Z_{oo} \operatorname{Tanh} \gamma l} \qquad (1)$$

where $Z_1$=the impedance reflected into the input coupling loop
$S_i$=mutual coupling impedance between the input loop and the cavity resonator
$S_o$=mutual coupling impedance between the output loop, if any, and the cavity resonator
$Z_2$=the impedance coupled into the tank from the second loop, if any
$Z_{oo}$=the characteristic impedance of the cavity resonator
$\gamma$=the complex propagation constant of the cavity resonator
$l$=the effective electrical length of the cavity resonator it follows that the impedances reflected into the input coupling loops 13, 14, 15 and 16 at frequencies off resonance can be made very small by the proper choice of loop coupling and cavity resonator. This low impedance reflected through the quarter wave length line sections 8, 9, 10 and 12 appears as a very high impedance at junctions 5, 6, 7 and 11. Because of the high impedance reflected at this junction through the shunt sections, the visual frequencies are transmitted over the line 3 and through the output line 4 without excessive reflections. Further, since tanks B and A are off resonance, the visual frequencies are substantially prevented from being transmitted into the aural frequency source through line 2.

In the case of the aural signal coming over the input line 2, the tanks A and B are at or very near resonance. The expression given above for $Z_1$ shows that at resonance, if the losses in the tank are small and if the input and output loops are equally coupled, $Z_1 \approx Z_2$. The aural signal is, therefore, transmitted through the tanks A and B in its entirety, except for the losses in the tanks themselves, to the output coupling line 12. Since the tank C is resonant as well at or very near the aural carrier frequency and since it has no output coupling loop, it follows from the above expression that the impedance coupled into the input coupling loop 15 is a very high impedance equal to $$\frac{S_i^2}{r}$$

where $r$ is the effective self-resistance of the tank. This high impedance is reflected through line section 10 and appears as a very low impedance at junction 7. When reflected through the quarter wave length line section between 7 and 11, this very low impedance appears as a very high impedance at junction 11. The aural signal is, therefore, hindered from being transmitted down this branch line and goes directly from output coupling branch 12 to output line 4. A second similar action is established by tank D and the coupling loop 14 with the line section 9 which results in a second short circuit being placed at point 6 to further hinder what little aural signal does pass by points 11 and 7. The aural signals are, therefore, substantially prevented from being transmitted to the visual frequency source.

It follows from the explanation given above that the signal impressed upon the line 1 travels over the line 3 to the output line 4 with very little reflection or absorption in the rest of the circuit and that the second signal impressed upon the input 2 will also travel out over the output line 4 with very little reflection or absorption in the rest of the circuit.

It further follows from the explanation above and from Equation 1 that the loop coupling has an important effect on the following characteristics:

(*a*) The passage of the signal impressed on line 1 over line 3 to the output 4 without excessive reflections or undesirable non-linear phase shift at junctions 5, 6, 7 and 11;
(*b*) The undesirable absorption of this signal impressed on line 1 by both the dummy load 17 via tank E through line 8, and the line 2 termination via tanks A and B through line 12;
(*c*) The undesirable loss in the tanks A and B of the signal impressed on line 2 and passing through these tanks to output line 4; and
(*d*) The undesirable absorption of this signal impressed on line 2 by the line 1 termination through line 3.

It may be seen that these characteristics require conflicting values of loop coupling; i.e., to minimize reflections and undesirable non-linear phase shift on the signal impressed on line 1, the coupling of loops 13, 14, 15 and 16 should be as small as possible. However, to minimize the undesirable absorption of the signal impressed on line 2 through line 3, the coupling of loops 14 and 15 should be as large as possible. Similarly, to minimize the undesirable absorption of the signal impressed on line 1 through line 12, the coupling of loops 16, 17, 18 and 19 should be as small as possible while to minimize the undesirable loss in the tanks A and B of the signal impressed on line 2, the coupling of these same loops should be as large as possible.

The compromise values of loop coupling may be chosen as a function of the use to which the diplexing system is to be put. As a typical example, when the diplexing system is to be used in a television transmitting station to combine the aural and visual signals into a single output, the following guides can be used to determine the various loop couplings:

(*a*) The couplings of loops 16 and 17 are made equal to each other as well as the couplings of loops 18 and 19 to each other so that $Z_1 \approx Z_2$ and the aural signal impressed on line 2 will be transmitted through the tanks A and B in its entirety except for the losses in the tanks themselves;
(*b*) In addition, the couplings of loops 16 and 17 are made equal to those of loops 18 and 19 so that the losses in tanks A and B will be equal to facilitate efficient cooling;
(*c*) The coupling of loop 15 is also made equal to that of loop 16 so that the small discontinuity reflected by tank B through loop 16 and line 12 to line 3 at visual frequencies will be approximately canceled by a similar discontinuity on line 3 at junction 7, an odd number of quarter wave lengths away, from tank C through loop 15 and line 10;
(*d*) The coupling of loops 15 and 16, and, therefore, of loops 17, 18 and 19 is chosen so that the group delay, $d\varphi/dw$ where $$\varphi = \text{phase}$$

and $$w = 2\pi \times \text{frequency}$$

sometimes referred to as envelope phase delay, introduced on lines 1, 3 and 4 by tanks B and C into the visual signal is not more than approximately .15 microsecond at a frequency of 4.18 mc. above the visual carrier relative to the delay at the visual carrier frequency;
(*e*) The coupling of loop 14 is chosen so that the aural-to-visual rejection, a measure of the undesirable absorption of the signal impressed on line 2, by the line 1 termination through line 3, is over 30 decibels for a range of approximately ±30 kilocycles around the aural carrier frequency;
(*f*) The coupling of loop 13 is then chosen so that the voltage standing wave ratio as measured along line 1 is less than 1.10 from that frequency which corresponds to the lower end of the six megacycle television channel to that frequency which equals the visual carrier frequency plus 4.18 megacycles;
(*g*) Finally, the coupling of loop 20 is made approximately equal to that of loop 13 such that at the resonant frequency of the tank, $Z_1 \approx Z_2$.

Although the resonant frequency of tanks A, B, C, D and E may all be made equal to the aural carrier frequency as a first approximation, the following improved and, therefore, preferable arrangement allows one to achieve the necessary aural-to-visual rejection with a lower relative envelope phase delay characteristic than would exist if the tanks were all tuned to the aural carrier frequency.

Figure 2:
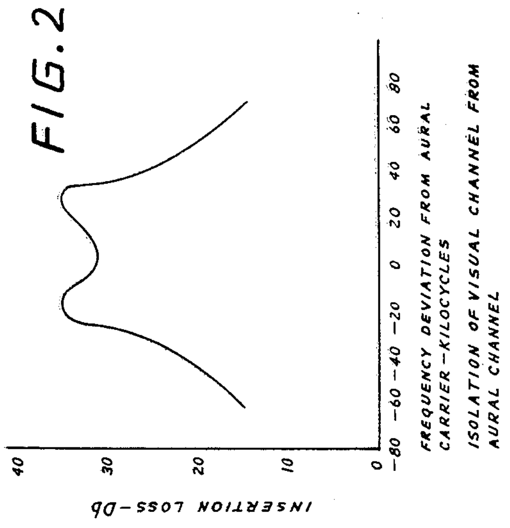

If tanks C and D, instead of both being tuned to the aural carrier frequency, are tuned so that one tank resonates 20 kilocycles above the aural carrier frequency, and the other resonates 20 kilocycles below the aural carrier frequency, an aural-to-visual rejection curve similar to that shown in FIGURE 2 results. Neither of the two peaks of the curve show an aural-to-visual rejection equal to that which could be obtained if the tanks were tuned to the same frequency (approximately 50 decibels). However, the range of frequencies with an aural-to-visual rejection of 30 decibels or larger is greater than would result without the "stagger tuning."

Figure 3:
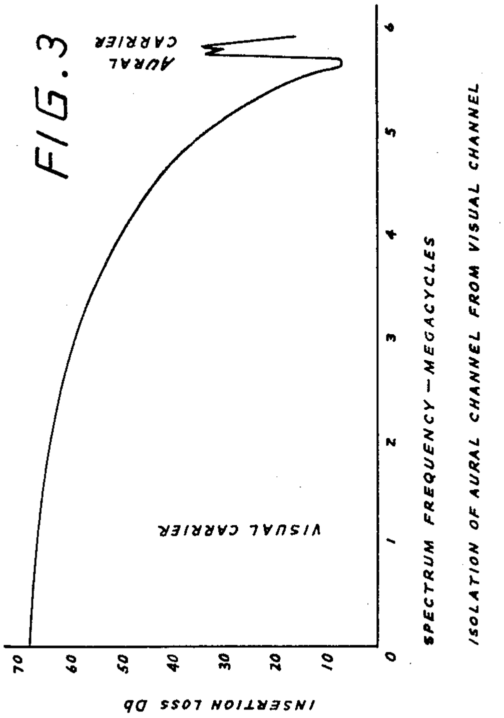

Tanks A and B are normally tuned to the aural carrier frequency for maximum power transfer of the aural signal impressed on line 2. A typical amplitude response of a diplexing system aural channel (line 2, tanks A and B, and lines 12 and 4) is shown in FIGURE 3. As described above, the shape of the curve and the amount by which it fails to reach a relative voltage of 1.0 (representing the loss in the system) are both functions of the coupling of the loops in tanks A, B and C.

Tank E is normally tuned to or slightly above the aural carrier frequently. The purpose of tank E is to provide an approximately matched load to visual frequencies around the aural carrier frequency where tanks C and D are beginning to reflect low impedances across line 3 through lines 9 and 10. It is desirable that the visual line be approximately matched at all frequencies in the television channel up to and including the aural carrier frequency in order that the visual transmitter may be more stable in its operation.

Figure 4:
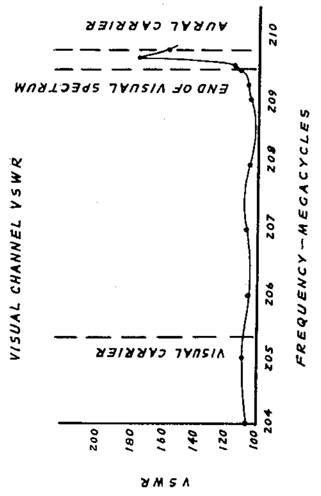

A typical visual channel (lines 1, 3 and 4) voltage standing wave ratio plot as a function of frequency is shown in FIGURE 4.

A typical rejection (between inputs 1 and 2) curve is shown in FIGURE 5 as a function of frequency in a television channel. The resultant typical relative envelope phase delay of the diplexer system described is shown in FIGURE 6 as a function of the modulating frequency on a visual carrier.

When the diplexing filter is used with very high power transmitters such as are sometimes used in television transmission stations, that portion of the total power which is impressed on line 2 that is dissipated as tank losses in each of tanks A, B and C is of sufficient magnitude to cause these tanks to undergo a relatively high increase in temperature. Since the component parts of the individual tanks are generally made of copper or copperplated brasses, this increase in temperature results in an overall thermal expansion of the various components of the tank. Since the frequency stability of the diplexing filter should be maintained to some four or five parts in some 200,000 parts (±4 kc. in 200 mc.), such detuning caused by temperature rise is undesirable.

To compensate for this thermal detuning of the tanks, the following devices may be used:

(*a*) As shown in FIGURE 7, the inner conductors of the coaxial resonant cavities or tanks are made up of two co-liner tubes 60 and 61 joined in the center by a split ring or bullet 63 which maintains an internal pressure contact against each of the two inner conductors. The bullet is preferably placed in the center of the inner conductor length because the center is a point of minimum current in a half-wave resonant coaxial cavity. At this point contact resistance has a negligible effect. The bullet, however, allows the two parts of the inner conductor to expand or contract without sacrificing the electrical contact and without changing the overall length of the tank. The length of the outer conductor then controls the resonant frequency of the tank.

(*b*) In addition, a blower may be connected to tanks A, B and C as shown in FIGURE 1 in such a way that air is blown through the inside of the tubes and bullets forming the inner conductors. To aid in the cooling, an insert 64 is placed inside of these tubes to speed the flow of air through the peripheral space formed between the insert and the tube. In this way, much of the heat dissipated in the tank is removed by the air blast so that the temperature rise is substantially reduced.

(*c*) In order to compensate for the thermal expansion of the outer conductor by the heat that remains in the tank as well as changes in the ambient temperature, a temprature compensating device is mounted on each of the five tanks in the system. This device may be made as shown in FIGURES 7 and 8.

In FIGURE 7 rods 21 and 22 are made of Invar steel and have, therefore, a very low thermal coefficient of expansion. As the tank undergoes thermal expansion or contraction, the distance between pivots 23 and 24 increases or decreases respectively. Since the length of the rods 21 and 22 changes very little with temperature, this change in distance between pivots results in an increasing or decreasing, respectively, of the angle between rods 21 and 22 about pivot 25. As this angle changes, the plunger 26 (which is connected through bellows 27 to the outer conductor of the tank) is moved out when the overall length of the outer conductor increases and in towards the inner conductor when the overall length of the outer conductor decreases. Since the plunger controls the amount of discontinuity capacity between itself and the inner conductor, as the plunger moves towards the inner conductor, the discontinuity capacity between itself and the inner conductor increases and the resonant frequency of the tank is decreased. By properly adjusting the ratio of the plunger displacement for a given increment of outer conductor overall length change, a system can be made whose resonant frequency is substantially independent of temperature over a relatively large temperature range. This adjustment is made by controlling the initial length of rods 21 and 22 through the adjustment of fine pitch nuts 28 and 29 on the threaded ends of rods 21 and 22. To avoid undue strain on the bellows 27, shaft 30 is threaded into shaft 31 which, in turn, through ball bearing 32, allows the plunger 26 to be moved independently of the rods 21 and 22 and the pivot 24. A spring 33 is used to take up the slack in the system and thereby increase the stability.

In the modification shown in FIGURE 8 the arrangement is slightly different than that in FIGURE 7 in that when the outer cylinder elongates through raise in the temperature of the outer walls, the angle between the rods 70 and 72 and 71 and 73 increase with the result that the point of pivot 74 rises and draws the plunger 26 outwards towards the outer wall 75. The result is the same as the effect in FIGURE 7. As the plunger moves outwards the discontinuity capacity decreases and the resonant frequency of the tank is increased. Upon the inward motion of the plunger brought about by the shortening of the wall length the discontinuity capacity increases and the resonant frequency of the tank is decreased.

To eliminate the need for extremely close manufacturing tolerances on the overall length of the tank, a plunger 34, which may be a separate plunger as shown or may be a part of the temperature compensation system, is used to adjust the resonant frequency of the tank to its desired value.

Having now described our invention, we claim:

1. A diplexing system for feeding an antenna through a single feeder from independent sources having different carrier frequencies comprising a line for feeding one of said carrier frequencies directly to said single feeder, a plurality of cavities resonating in the vicinity of the second carrier frequency, lines providing quarter wave lengths at the second carrier frequency connecting said cavities in parallel to said line for feeding the first mentioned carrier frequency, said quarter wave length lines being connected to said line for feeding the first mentioned carrier frequency, at distances apart of one quarter wave length of said second carrier frequency, a second set of cavities resonating to said second carrier frequency and means for feeding said second carrier frequency through said second set of cavities to said single feeder.

2. A diplexing system for feeding an antenna through a single feeder from independent sources having different carrier frequencies comprising a line for feeding one of said carrier frequencies directly to said single feeder, a plurality of cavities resonating in the vicinity of the second carrier frequency, lines providing quarter wave lengths at the second carrier frequency connecting said cavities in parallel to said line for feeding the first mentioned carrier frequency, said quarter wave length lines being connected to said line for feeding the first mentioned carrier frequency, at distances apart of one quarter wave length of said second carrier frequency, a second set of cavities resonating to said second carrier frequency having equal input and output impedances coupling loops, and means for feeding said second carrier frequency through said second set of cavities to said single feeder.

3. A diplexing system for feeding an antenna through a single feeder from independent sources having different carrier frequencies comprising a line for feeding one of said carrier frequencies directly to said single feeder, a plurality of cavities resonating in the vicinity of the second carrier frequency, lines providing quarter wave lengths at the second carrier frequency connecting said cavities in parallel to said line for feeding the first mentioned carrier frequency, said quarter wave length lines being connected to said line for feeding the first mentioned carrier frequency, at distances apart of one quarter wave length of said second carrier frequency, a second set of cavities resonating to said second carrier frequency having line connections to the cavities of one quarter wave length at the second carrier frequency and coupling loops in the cavities at the end of the quarter wave length line connections thereto having equal input and output impedances and means for feeding said second carrier frequency through said second set of cavities to said single feeder.

4. In a diplexing system for feeding an antenna through a single feeder from independent sources having differing carrier frequencies, a plurality of resonating cavities tuned in the vicinity of one of the carrier frequencies, means for maintaining the tuning of the cavity to the desired frequency comprising a plurality of rods having substantially constant lengths under changing temperatures linked lengthwise of the cavity, means providing points of pivot between said rods and the ends of the cavity and means attached to said linked together rods extending into said cavity for varying the capacitance of the cavity by the extension of said means into said cavity.

5. In a diplexing system for feeding an antenna through a single feeder from independent sources having differing carrier frequencies, a plurality of resonating cavities tuned in the vicinity of one of the carrier frequencies, means for maintaining the tuning of the cavity to the desired frequency, comprising a pair of members pivoted together at one end and at their other ends having pivotable connections one at each end of the resonating cavity, a member extending from said pivot at said one end through the wall of said cavity and having means at the end thereof to vary the capacitance and, therefore, resonant frequency of the cavity, said members having substantially constant length under changing temperatures.

6. A diplexing system for feeding an antenna through a single feeder from independent sources having different carrier frequencies comprising a line for feeding one of said carrier frequencies directly to said single feeder, a plurality of cavities resonating in the vicinity of the second carrier frequency, lines providing quarter wave lengths at the second carrier frequency connecting said cavities in parallel to said line for feeding the first mentioned carrier frequency, said quarter wave length lines being connected to said line for feeding the first mentioned carrier frequency, at distances apart of one quarter wave length of said second carrier frequency, a second set of cavities resonating to said second carrier frequency and means for feeding said second carrier frequency through said second set of cavities to said single feeder said second set of cavities having both input and output loops and said first set of cavities having input loops.

7. A diplexing system for feeding an antenna through a single feeder from independent sources having different carrier frequencies comprising a line for feeding one of said carrier frequencies directly to said single feeder, a plurality of cavities resonating in the vicinity of the second carrier frequency, lines providing quarter wave lengths at the second carrier frequency connecting said cavities in parallel to said line for feeding the first mentioned carrier frequency, said quarter wave length lines being connected to said line for feeding the first mentioned carrier frequency, at distances apart of one quarter wave length of said second carrier frequency, a second set of cavities resonating to said second carrier frequency and means for feeding said second carrier frequency through said second set of cavities to said single feeder said cavities having an inner hollow coaxial conductor with a spear extending within said inner conductor the length thereof and means for forcing air between the outer surface of the spear and the wall of said inner conductor for cooling the same.

8. A diplexing system for feeding an antenna through a single feeder from independent sources having different carrier frequencies comprising a line for feeding one of said carrier frequencies directly to said single feeder, a plurality of cavities resonating in the vicinity of the second carrier frequency, lines providing quarter wave lengths at the second carrier frequency connecting said cavities in parallel to said line for feeding the first mentioned carrier frequency, said quarter wave length lines being connected to said line for feeding the first mentioned carrier frequency, at distances apart of one quarter wave length of said second carrier frequency, a second set of cavities resonating to said second carrier frequency and means for feeding said second carrier frequency through said second set of cavities to said single feeder said cavities having an inner hollow coaxial conductor with a spear extending within said inner conductor the length thereof and means for forcing air between the outer surface of the spear and the wall of said inner conductor for cooling the same, said inner conductor being formed in two halves with a friction coupling conductive member within said inner conductor bearing on both said halves to provide good conductive connections between said halves under expansion and contraction due to temperature changes in said cavities.

9. In combination with a resonant cavity of the type described having opposed ends, frequency compensating means comprising a plurality of rods having substantially constant lengths under changing temperatures linked lengthwise of the cavity means providing points of pivot between said rods and the ends of the cavity, and means extending from said linked rods into said cavity for varying the resonant frequency of the cavity by the extension of said means into said cavity.

10. In combination with a resonant cavity of the type described, having opposed ends, frequency compensating means comprising means for maintaining the tuning of the cavity to a desired resonant frequency including a pair of members pivoted together at one end and at their other ends having pivotable connections one at each end of the cavity, a member extending from said one end through the wall of said cavity, and having means at the end thereof to vary the resonant frequency of the cavity, said members having substantially constant length under changing temperatures.

11. In combination with a resonant cavity of the type described having opposed ends, frequency compensating means comprising means for maintaining tuning of the cavity to a desired frequency including a pair of members each pivoted at one end one to each end of the cavity, a pair of arms pivoted together at one end and at their other ends having pivotable connections to the other end of respective ones of said pair of members, a second member extending from the pivotable interconnection of said arm through the wall of said cavity, and having means at the end thereof to vary the resonant frequency of the cavity, said members having substantially constant length under changing temperature, and spring means tensioning said second member inwardly through said wall.

12. Apparatus for coupling high frequency energy having spectral components within a first frequency range between a first terminal and a third terminal and for coupling high frequency energy having spectral components within a second frequency range between a second terminal and said third terminal while preventing energy having spectral components within said first frequency range and preventing energy having spectral components within said second frequency range from reaching said second and first terminals respectively comprising, said first, said second and said third terminals, first wave transmission means coupling said second terminal directly to said third terminal, a plurality of cavities each resonant at a frequency very close to a predetermined frequency embraced in said first frequency range, means including second wave transmission means for coupling some of said cavities to respective points of said first wave transmission means, and means including third wave transmission means in series with others of said cavities for coupling said first terminal to said third terminal, each of said second and third wave transmission means and the distance of said points of said first wave transmission means from said third terminal being substantially an odd multiple of a quarter electrical wavelength at said predetermined frequency, said first frequency range being closely adjacent to but different from said second frequency range, said means for coupling said some cavities including means for establishing a nearly reflectionless path along said first wave transmission means for energy with spectral components within said second frequency range while effectively preventing the transfer of energy having spectral components within said first frequency range, the span of said second frequency range being greater than the separation between said first and second frequency ranges.

13. Apparatus for coupling high frequency energy having spectral components within a first frequency range between a first terminal and a third terminal and for coupling high frequency energy having spectral components within a second frequency range between a second terminal and said third terminal while preventing energy having spectral components within said first frequency range and energy having spectral components within said second frequency range from reaching said second and first terminals respectively comprising, said first, said second and said third terminals, first wave transmission means coupling said second terminal directly to said third terminal, at least one cavity resonant very close to a predetermined frequency embraced by said first frequency range and coupled to a location on said first wave transmission means by means including second wave transmission means having an electrical length corresponding to an odd number of quarter wavelengths at said predetermined frequency for withdrawing from the latter means energy having spectral components within said first frequency range without disturbing the passage thereover of energy having spectral components within said second frequency range, the latter cavity being coupled to said first wave transmission means at said location thereof spaced from said third terminal by an electrical length corresponding substantially to an odd number of quarter wavelengths at said predetermined frequency so that said first wave transmission means presents a high impedance to energy of said predetermined frequency, and means including at least one cavity resonant and presenting a low impedance at said predetermined frequency in series with third wave transmission means between said first and third terminals for transmitting energy having spectral components within said first frequency range between the latter terminals while rejecting energy having spectral components within said second frequency range, said first frequency range being closely adjacent to but different from said second frequency range, the span of said second frequency range being greater than the separation between said first and second frequency ranges.

14. Apparatus for coupling high frequency energy having spectral components within a first frequency range between a first terminal and a third terminal and energy having spectral components within a second frequency range between a second terminal and said third terminal while preventing energy having spectral components within said first frequency range and energy having spectral components within said second frequency range from reaching said second and first terminals respectively comprising, said first, said second and said third terminals, first wave transmission means coupling said second terminal directly to said third terminal, at least one tuned electrical circuit resonant very close to a predetermined frequency in said first frequency range and coupled to said first wave transmission means by second wave transmission means having an electrical length corresponding substantially to an odd multiple of quarter wavelengths at said predetermined frequency for withdrawing from the latter means energy having spectral components within said first frequency range without disturbing the passage thereover of energy having spectral components within said second frequency range, the latter tuned electrical circuit being coupled by means including said second wave transmission means to said first wave transmission means at a point thereof spaced from said third terminal by an electrical length corresponding to substantially an odd multiple of quarter wavelengths at said predetermined frequency so that said first wave transmission means presents a high impedance to energy having spectral components within said first frequency range, and means including at least one tuned electrical circuit resonant and presenting a low impedance substantially at said predetermined frequency in series with third wave transmission means between said first and third terminals for transmitting energy having spectral components within said first frequency range between the latter terminals while rejecting energy having spectral components within said second frequency range, said first frequency range being closely adjacent to but different from said second frequency range, the span of said second frequency range being greater than the separation between said first and second frequency ranges.

References Cited in the file of this patent

UNITED STATES PATENTS

| | | |
|---|---|---|
| 1,933,668 | Gilman | Nov. 7, 1933 |
| 2,095,981 | Hansell | Oct. 19, 1937 |
| 2,124,029 | Conklin et al. | July 19, 1938 |
| 2,142,630 | Conklin | Jan. 3, 1939 |
| 2,238,438 | Alford | Apr. 15, 1941 |
| 2,445,582 | Melville | July 20, 1948 |
| 2,468,145 | Varian | Apr. 26, 1949 |
| 2,484,798 | Bradley | Oct. 11, 1949 |
| 2,513,761 | Tyson | July 4, 1950 |
| 2,553,811 | Carmine et al. | May 22, 1951 |
| 2,706,802 | Meisenheimer et al. | Apr. 19, 1955 |
| 2,713,152 | Brown | July 12, 1955 |
| 2,762,017 | Bradburd et al. | Sept. 4, 1956 |
| 2,763,839 | Fiet | Sept. 18, 1956 |
| 2,795,764 | Mittelman et al. | June 11, 1957 |